United States Patent
Main de Boissiere et al.

(10) Patent No.: US 12,505,642 B2
(45) Date of Patent: Dec. 23, 2025

(54) METHODS AND SYSTEMS FOR AUTOMATED THREE-DIMENSIONAL OBJECT DETECTION AND EXTRACTION

(71) Applicant: PREVU3D Technologies, Inc., Montreal (CA)

(72) Inventors: Alban Main de Boissiere, Montreal (CA); Maxime Herpin, Montreal (CA)

(73) Assignee: PREVU3D TECHNOLOGIES, INC., Montreal (CA)

( * ) Notice: Subject to any disclaimer, the term of this patent is extended or adjusted under 35 U.S.C. 154(b) by 381 days.

(21) Appl. No.: 17/960,303

(22) Filed: Oct. 5, 2022

(65) Prior Publication Data
US 2023/0107740 A1 Apr. 6, 2023

Related U.S. Application Data

(60) Provisional application No. 63/262,104, filed on Oct. 5, 2021.

(51) Int. Cl.
*G06V 10/48* (2022.01)
*G06V 10/26* (2022.01)
*G06V 20/64* (2022.01)

(52) U.S. Cl.
CPC .............. *G06V 10/48* (2022.01); *G06V 10/26* (2022.01); *G06V 20/64* (2022.01)

(58) Field of Classification Search
CPC ..... G06V 10/40–48; G06V 20/64–647; G06V 10/26–273
See application file for complete search history.

(56) References Cited

U.S. PATENT DOCUMENTS

| | | | | |
|---|---|---|---|---|
| 9,424,461 | B1* | 8/2016 | Yuan | G06V 20/647 |
| 2010/0197393 | A1* | 8/2010 | Geiss | G06T 7/251 |
| | | | | 463/30 |
| 2017/0220887 | A1* | 8/2017 | Fathi | G06T 7/55 |
| 2020/0372710 | A1* | 11/2020 | Wang | G06T 15/005 |
| 2021/0383115 | A1* | 12/2021 | Alon | A63F 13/77 |
| 2022/0019852 | A1* | 1/2022 | Eyjolfsdottir | G06T 17/205 |
| 2023/0260255 | A1* | 8/2023 | Tan | G06N 3/0464 |
| | | | | 382/100 |

* cited by examiner

*Primary Examiner* — Ross Varndell
(74) *Attorney, Agent, or Firm* — Taft Stettinius & Hollister LLP

(57) ABSTRACT

A method for extracting a 3D object from a 3D environment, including segmenting an initial 2D scene obtained from an initial viewpoint to identify a plurality of object instances; mapping a selected object instance to an initial subset of triangles underlying the selected object instance; generating additional viewpoints around the selected object instance, and for each additional viewpoint: generating a further 2D scene from the additional viewpoint; segmenting the further 2D scene, thereby identifying candidate object instances; identifying a given candidate object instance as best matching the selected object instance, thereby obtaining a best matching candidate object instance; identifying an additional subset of triangles underlying the best matching candidate object instance; aggregating the additional subset of triangles to the initial subset of triangles; and outputting the aggregated subset of the triangles.

15 Claims, 9 Drawing Sheets

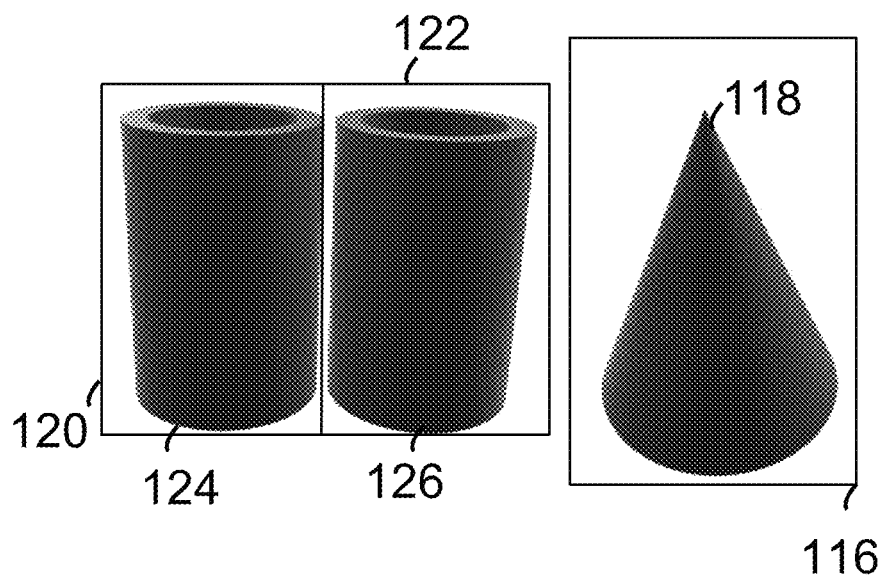
FIGURE 1B
$$\begin{pmatrix} 1111000000000 \\ 1111100000001 \\ 0000000111111 \\ 0000000011111 \\ 1111111000111 \end{pmatrix} 121$$
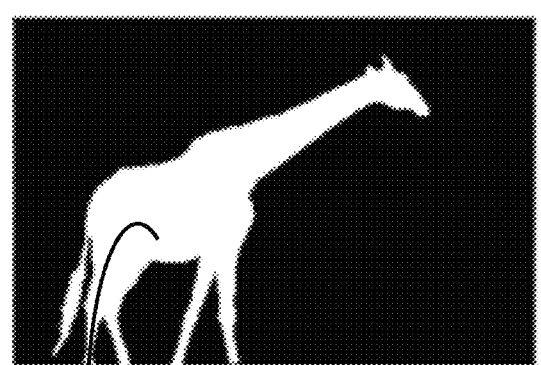
FIGURE 1C  FIGURE 1D

$$\begin{pmatrix} 2222223333334 \\ 2222233333344 \\ 2222333333444 \\ 2233333355555 \\ 2333333555555 \end{pmatrix} \right\} 211$$

FIGURE 2A

$$\underbrace{\begin{pmatrix} 2222223333334 \\ 2222233333344 \\ 2222333333444 \\ 2233333355555 \\ 2333333555555 \end{pmatrix}}_{211} \times \begin{pmatrix} 0011000000000 \\ 0111100000000 \\ 1111111000000 \\ 1111111000000 \\ 1111111000000 \end{pmatrix}^{121}$$

$$=$$

$$221 \begin{pmatrix} 0022000000000 \\ 0222200000000 \\ 2222330000000 \\ 2233333300000 \\ 2333333000000 \end{pmatrix}$$

FIGURE 2C

METHODS AND SYSTEMS FOR AUTOMATED THREE-DIMENSIONAL OBJECT DETECTION AND EXTRACTION

CROSS-REFERENCE TO RELATED APPLICATION

This application claims the benefit of U.S. Provisional Application No. 63/262,104, filed Oct. 5, 2021, the entire contents of which are incorporated herein by reference.

TECHNICAL FIELD

The present disclosure relates to methods, systems and apparatuses for editing virtual three-dimensional spaces that are accessible through an imaging device. More specifically, the present disclosure relates to methods, systems and apparatuses for detecting and extracting three-dimensional objects from representations of three-dimensional spaces.

BACKGROUND

Three-dimensional "scans" of real-world environments are typically acquired by way of lasers, structured light or photogrammetry technologies that do not embed semantic information. The scanned environment is usually represented as a single three-dimensional point cloud where each data point is a colored coordinate in the three-dimensional space. As such, each point is dissociated from its associated semantic information. For example, chairs and tables are all merged inside the point cloud, with no way to determine the exact nature of the real-world object being represented in the resulting three-dimensional visual representation of the real-world environment.

A point cloud can be converted to a polygon mesh in which the real-world environment is represented as a collection of polygons without semantic content regarding the real-word environment. It will be readily appreciated that including semantic information in three-dimensional scans of real-world environments can lead to many suitable applications in a wide variety of industries, such as automatic labeling of objects or environment features, or facilitating the "extraction" of objects represented in the three-dimensional environment.

One potential solution to the challenge presented by a lack of semantic information is instance segmentation, which is a computer vision task that aims to detect and delineate objects in a particular scene. For example, in a scene that contains a number of tables, it is contemplated that a suitable instance segmentation model can visually separate the different tables and output a segmentation mask for each table that is detected. 3D instance segmentation can benefit from the geometric representation of the data. However, instance segmentation algorithms depend on the nature of the data under consideration. When considering 2D data such as pictures, the suitable pixels that represent the object under consideration can be identified and segmented; when considering 3D data such as point clouds the coordinates in space of the data points that represent the object under consideration can be identified and segmented; and when considering polygonal meshes representing 3D data, the polygons that represent the object under consideration can be identified and segmented. 3D Instance segmentation algorithms are computationally expensive and as a result do not scale well to large visual scenes. On the other hand, two-dimensional instance segmentation requires multiple viewpoints to fully visualize a three-dimensional object and can suffer from occlusion.

As such, there is a need for improved methods and systems for automatically identifying three-dimensional objects in three-dimensional digital representations of real-world environments and then subsequently extracting the identified three-dimensional object in a computationally efficient manner, all without having access to semantic information relating to the three-dimensional object under consideration.

SUMMARY OF THE INVENTION

An automated object instance extraction process from a textured mesh of a 3D scan is disclosed below.

According to a first aspect, there is provided a method for extracting a three-dimensional (3D) object from a 3D environment comprising a mesh of triangles, the method comprising: segmenting an initial two-dimensional (2D) scene of the 3D environment obtained from an initial viewpoint, thereby identifying a plurality of object instances within the initial 2D scene; mapping a selected one of the object instances to an initial subset of the triangles underlying the selected one of the object instances, wherein the selected one of the object instances is to be extracted; generating a plurality of additional viewpoints around the selected one of object instances within the 3D environment, and for each one of the plurality of additional viewpoints: generating a further 2D scene of the 3D environment from the additional viewpoint; segmenting the further 2D scene, thereby identifying candidate object instances present in the further 2D scene; identifying a given one of the candidate object instances as best matching the object instance to be extracted, thereby obtaining a best matching candidate object instance; identifying an additional subset of the triangles underlying the best matching candidate object instance; and aggregating the additional subset of the triangles to the initial subset of the triangles, thereby obtaining an updated subset of the triangles; and outputting the updated subset of the triangles, thereby extracting the object instance to be extracted.

In one embodiment, the method further comprises identifying, from the initial subset of the triangles, outlier triangles that do not belong to the selected one of the object instances and removing the outlier triangles from the initial subset of the triangles.

In one embodiment, the method further comprises identifying, from the additional subset of the triangles, outlier triangles that do not belong to the best matching candidate object instance and removing the outlier triangles from the additional subset of the triangles.

In one embodiment, the method further comprises at least one of adding missing triangles of the selected object instance to the initial subset of the triangles and removing extra triangles associated with the selected object instance from the initial subset of the triangles.

In one embodiment, the step of mapping the selected one of the object instances to the initial subset of triangles comprises performing a matching operation between a triangle identification map and an initial segmentation mask corresponding to the object instance to be extracted to identify the subset of triangles.

In one embodiment, the matching operation comprises: retrieving the initial segmentation mask corresponding to the object instance to be extracted; retrieving the triangle identification map, wherein the triangle identification map corresponds to the 2D scene captured from said initial viewpoint; and correlating said triangle identification map to said segmentation mask corresponding to the object instance to be extracted to identify the initial subset of triangles.

In one embodiment, the plurality of additional viewpoints are positioned on a surface of one of an ellipsoidal encapsulating the selected object instance and a sphere encapsulating the selected object instance.

In one embodiment, the step of identifying the given one of the candidate object instances as best matching the object instance to be extracted comprises: building a candidate bounding box around each candidate object instance and a selected bounding box around the selected object instance; computing an intersection over union ratio between each candidate bounding box and the selected bounding box; and identifying the candidate object instances having a highest intersection-over-union ratio value and determining the candidate object instance corresponding to said identified candidate object instance as the best matching candidate object instance.

According to another broad aspect, there is provided a system for extracting a three-dimensional (3D) object from a 3D environment comprising a mesh of triangles, the system comprising: a processor; and a non-transitory computer-readable storage medium having instructions stored thereon that, when executed, causes the processor to: segment an initial two-dimensional (2D) scene of the 3D environment obtained from an initial viewpoint, thereby identifying a plurality of object instances within the initial 2D scene; map a selected one of the object instances to an initial subset of the triangles underlying the selected one of the object instances, wherein the selected one of the object instances is to be extracted; generate a plurality of additional viewpoints around the selected one of object instances within the 3D environment, and for each one of the plurality of additional viewpoints: generate a further 2D scene of the 3D environment from the additional viewpoint; segment the further 2D scene, thereby identifying candidate object instances present in the further 2D scene; identify a given one of the candidate object instances as best matching the object instance to be extracted, thereby obtaining a best matching candidate object instance; identify an additional subset of the triangles underlying the best matching candidate object instance; and aggregate the additional subset of the triangles to the initial subset of the triangles, thereby obtaining an updated subset of the triangles; and output the updated subset of the triangles, thereby extracting the object instance to be extracted.

In one embodiment, the processor is further configured for identifying, from the initial subset of the triangles, outlier triangles that do not belong to the selected one of the object instances and removing the outlier triangles from the initial subset of the triangles.

In one embodiment, the processor is further configured for identifying, from the additional subset of the triangles, outlier triangles that do not belong to the best matching candidate object instance and removing the outlier triangles from the additional subset of the triangles.

In one embodiment, the processor is further configured for at least one of adding missing triangles of the selected object instance to the initial subset of the triangles and removing extra triangles associated with the selected object instance from the initial subset of the triangles.

In one embodiment, said mapping the selected one of the object instances to the initial subset of triangles comprises performing a matching operation between a triangle identification map and an initial segmentation mask corresponding to the object instance to be extracted to identify the subset of triangles.

In one embodiment, the matching operation comprises: retrieving the initial segmentation mask corresponding to the object instance to be extracted; retrieving the triangle identification map, wherein the triangle identification map corresponds to the 2D scene captured from said initial viewpoint; and correlating said triangle identification map to said segmentation mask corresponding to the object instance to be extracted to identify the initial subset of triangles.

In one embodiment, the plurality of additional viewpoints are positioned on a surface of one of an ellipsoidal encapsulating the selected object instance and a sphere encapsulating the selected object instance.

In one embodiment, said identifying the given one of the candidate object instances as best matching the object instance to be extracted comprises: building a candidate bounding box around each candidate object instance and a selected bounding box around the selected object instance; computing an intersection over union ratio between each candidate bounding box and the selected bounding box; and identifying the candidate object instances having a highest intersection-over-union ratio value and determining the candidate object instance corresponding to said identified candidate object instance as the best matching candidate object instance.

According to a further broad aspect, there is provided an apparatus for extracting a three-dimensional (3D) object from a 3D environment comprising a mesh of triangles, the apparatus comprising: an instance segmentation module for segmenting an initial two-dimensional (2D) scene of the 3D environment obtained from an initial viewpoint, thereby identifying a plurality of object instances within the initial 2D scene; a mapping module for mapping a selected one of the object instances to an initial subset of the triangles underlying the selected one of the object instances, wherein the selected one of the object instances is to be extracted; a viewpoint generation module for generating a plurality of additional viewpoints around the selected one of object instances within the 3D environment; a processor configured to, for each additional viewpoint of the plurality of additional viewpoints: generate a further 2D scene of the 3D environment from the additional viewpoint; direct the instance segmentation module to segment the further 2D scene, thereby identifying candidate object instances present in the further 2D scene; identify a given one of the candidate object instances as best matching the object instance to be extracted, thereby obtaining a best matching candidate object instance; direct the mapping module to identify an additional subset of the triangles underlying the best matching candidate object instance; aggregate the additional subset of the triangles to the initial subset of the triangles, thereby obtaining an updated subset of the triangles; and output the updated subset of the triangles, thereby extracting the object instance to be extracted.

In one embodiment, the apparatus further comprises a filter for identifying, from the initial subset of the triangles, outlier triangles that do not belong to the selected one of the object instances and removing the outlier triangles from the initial subset of the triangles.

In one embodiment, the apparatus further comprises a filter for identifying, from the additional subset of the triangles, outlier triangles that do not belong to the best matching candidate object instance and removing the outlier triangles from the additional subset of the triangles.

In one embodiment, the mapping module is configured to identify the subset of triangles using a matching operation between a triangle identification map and a segmentation mask of the selected object instance.

In one embodiment, a viewpoint is defined by a 3D position within the 3D virtual environment. In another embodiment, a viewpoint is defined by a 3D position within the 3D virtual environment and a view direction which may be defined as at least one vector. In a further embodiment, a viewpoint is defined by a 3D position within the 3D virtual environment and a rotation. For example, the rotation may be defined by two vectors. However, it should be understood that a viewpoint may be defined using any method known to the person skilled in the art.

BRIEF DESCRIPTION OF THE DRAWINGS

Further features and advantages of the present technology will become apparent from the following detailed description, taken in combination with the appended drawings, in which:

FIG. 1B illustrates a segmented 3D scene, in accordance with an embodiment;

FIG. 1C illustrates a matrix representing a mask, in accordance with an embodiment;

FIG. 1D illustrates an image on which a mask is applied, in accordance with an embodiment;

FIG. 2A illustrates a matrix representing a triangle ID Map, in accordance with an embodiment;

FIG. 2C illustrates a pixel-wise multiplication of two matrixes, in accordance with an embodiment;

DETAILED DESCRIPTION

Figure 1A:
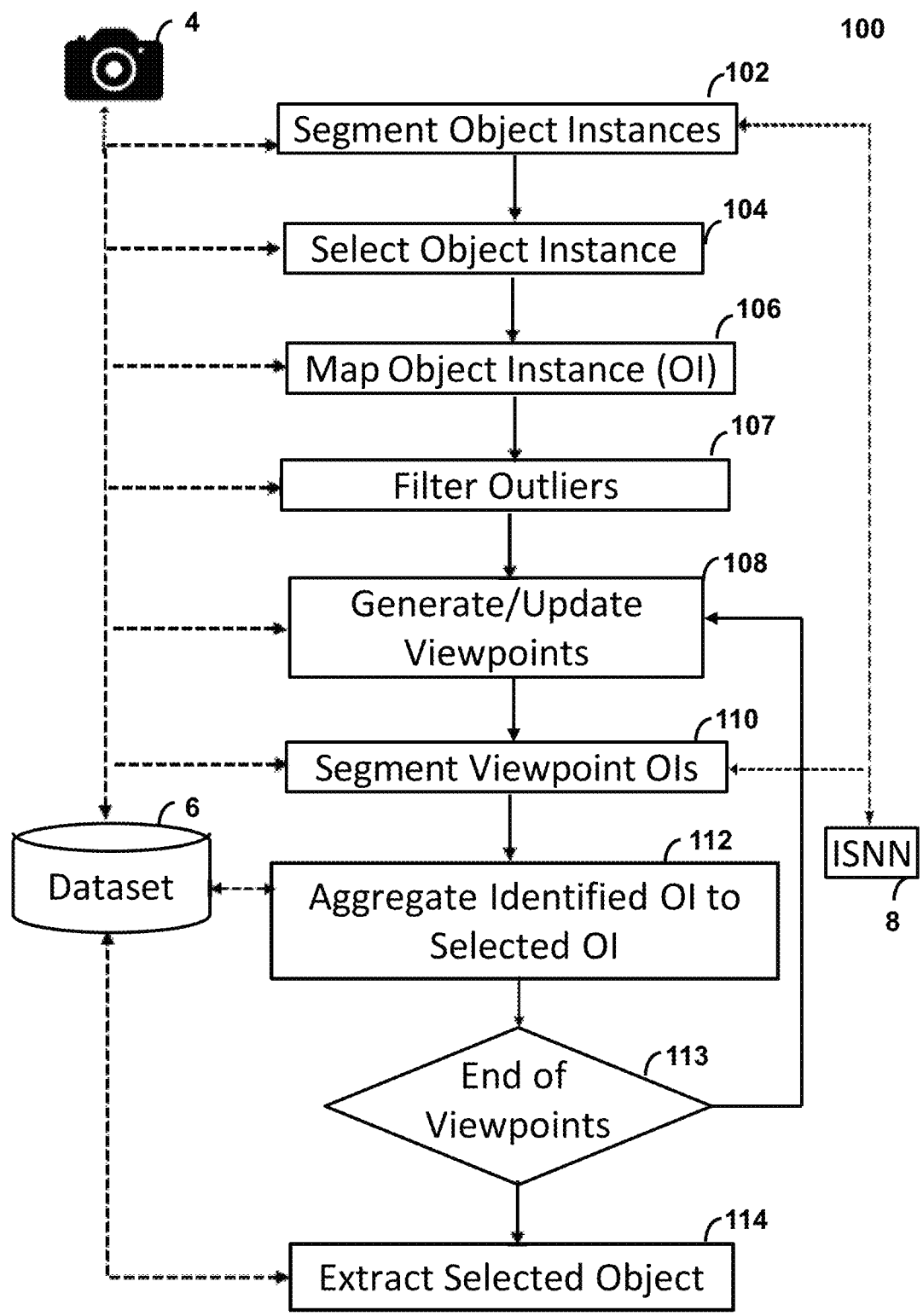
FIG. 1A is a flow chart illustrating a method for extracting a 3D object from a 3D environment, in accordance with an embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

It would be beneficial to provide an automated object instance extraction process that is efficient for an application to implement an object extraction process with minimal user input. It will be noted that the present method and system can utilize a two-dimensional (2D) approach to extract three-dimensional (3D) objects from 3D digital visual representations of real-world environments Embodiments of the present application provide methods, systems and apparatuses for extracting objects from a 3D environment by processing 2D scenes obtained from a plurality of viewpoints around the objects to be extracted.

FIG. 1A illustrates an embodiment of a method 100 for extracting an object in a 3D virtual environment. The 3D virtual environment can be a virtual representation of a physical or real environment such as a room, a building an industrial space or any other space with objects presents in it. Alternatively, the 3D virtual environment can be a computer-generated environment. In these embodiments, an imaging device 4 is used to capture 2D scenes/images of the 3D environment. The imaging device 4 can be a camera, a virtual camera or any device such as a computer or smartphone capable of capturing a scene or providing a view of a scene from a certain viewpoint.

At step 102, a 2D initial scene or image of the 3D virtual environment obtained from a given viewpoint is segmented to obtain the objects contained in the initial scene. It should be understood that any adequate method for segmenting 2D images may be used. For example, the 2D initial scene may be presented to a 2D Instance Segmentation Neural Network (ISNN) 8 which segments the object instances present in the initial scene. The ISNN 8 can be based on the YOLACT instance segmentation model. Other instance segmentation models known to those skilled in the art including Mask R-CNN, PANet and DetectoRS can be used to perform the instance segmentation. In one embodiment, a modified version of the YOLACT instance segmentation model can be used in which the input resolution is lowered and a binary classification between "object" and "no object" is used. Use of a binary classification allows the instance segmentation model to be generalized to new objects which in turn allows the segmentation process to be applicable to a large array of object types with satisfactory results.

At step 102, the initial scene is segmented and a segmentation mask is applied to each visible object of the scene. The segmentation step 102 outputs a 2D binary mask for each detected object instance. The segmentation mask is a 2D image where a pixel is filled if it lies on the current detected object. Therefore, when the mask is superposed to the screen, the white pixels seem to fill the object 123 as illustrated in FIG. 1D. A segmentation mask applied to an object instance can be represented as a matrix with a binary classification. FIG. 1C shows an exemplary segmentation mask matrix 121 representing a masked object instance. In this embodiment, each element of the segmentation mask matrix 121 is associated to a pixel in the scene and its binary value (0 or 1) represents the value associated to that pixel according to the binary classification used by the ISSN 8. FIG. 1B illustrates an exemplary scene comprising objects 118, 124 and 126 with segmentation masks 116, 120 and 122 applied respectively to each visible instance of the objects 118, 124 and 126. The application of a segmentation mask to each detected object instance allows a user to distinguish the different objects present and to select an object for extraction.

In one embodiment, a segmentation mask is applied to selected visible objects of the scene. This selection of the objects can be based on size, shape and/or any other characteristic that can be used to identify the objects. In an other example, the ISNN 8 may be seeded with information that readily identify the object(s) to be selected. In this case, a segmentation mask is applied only to the object readily identified. For example, in an environment comprising a furnace and pipes, the seed information may identify the furnace and the ISNN 8 will only apply a segmentation mask to the furnace which is the object to be selected.

Referring back to FIG. 1A, at step 104, the identification of an object instance selected for extraction is received. Using the example of FIG. 1B one or more of the objects 118, 124 and 126 can be selected for extraction. The object instance selection of step 104 can be done by a user or automated as depicted above in the embodiment where the ISNN 8 is seeded with information identifying the object to be selected. At step 106, the selected object instance is mapped to the underlying 3D data in the scene representing the selected object instance. In at least some embodiments, the 3D environment is represented by a mesh of triangles and each object instance is associated with a respective set of triangles underneath it. In another embodiment, other polygons known to those skilled in the art can be used to represent the 3D data. This step 106 matches the selected 2D overlaying segmentation mask to the subset of triangles underlying the selected object instance. The details of the operation of step 106 is further described hereinafter with respect to FIGS. 2A, 2B and 2C.

Embodiments of the present method provide for an optional filtering operation performed at step 107 to correct imperfection in the segmentation process by discarding triangle outliers. Outliers may also result from imperfections in the geometry of the underlying 3D data. In these embodiments, triangle outliers are removed. An exemplary filtering operation is described below with regards to FIG. 5.

From the given viewpoint associated with the initial scene, only a subset of the triangles associated with the object instance to be extracted are visible, hence the need to generate a plurality of viewpoints around the object instance selected for extraction to ensure that all triangles associated with the object instance can be detected. Using the geometric information of the known triangles of the selected object instance to be extracted, viewpoints are generated around the selected object instance at step 108. The viewpoints can be generated to define a trajectory surrounding the selected object instance and centered at the center of mass of the selected object instance. Embodiments of the present invention provide for the trajectory to be on a surface of an ellipsoid with the viewpoints placed at one or more planes or orbits defined on the surface of the ellipsoid. Alternatively, the trajectory can be defined on the surface of a sphere encapsulating the selected object instance. The trajectory may also be chosen using information from the 3D data around the object as to not intersect with unwanted objects. The trajectory may also be decided by inferring on the shape of the selected object using a neural network or any other method that can recognize the shape of objects. In a further embodiment, the position and/or number of viewpoints and/or the trajectory may be randomly selected.

In one embodiment, the flowchart 100 progresses through the viewpoints in a unidirectional manner (1, 2. 3 . . . to N). In another embodiment, the flowchart 100 progresses through the viewpoints by alternating the direction of progression (1, N, 2, N−1, 3, N−2 . . . ). Other progression schemes, including a random walk through the generated viewpoints can be used for the purpose of the present method without departing from its scope. When the trajectory is ellipsoidal, the coordinate system of the ellipsoid can be centered around the selected object instance, the ellipsoid is raised to the maximum height coordinate of the selected object instance. Viewpoints can then be generated such that the views of the scene alternate between directly looking at the selected object instance and looking from above it to ensure a greater coverage of the selected object instance. In certain embodiments the viewpoints can be updated to take into consideration a shape or size of the selected object instance. In reality, the shape or size of the selected object instance may not be known in advance but discovered as the flowchart 100 progresses through the viewpoints. In these embodiments, the viewpoints may be updated according to the newly discovered shape or size of the selected object instance. Further details of the viewpoint generation are provided below with the description of FIG. 3A.

For each viewpoint generated at step 108, a 2D scene is captured from the current viewpoint and a segmentation of the object instances of the scene is performed at step 110. At step 112, a matching operation is initiated to identify a candidate object instance that best matches the selected object instance and the subset of triangles underlying the best matching candidate object instance is aggregated to the subset of triangles associated to the selected object instance. The matching operation considers all the object instances visible from the current viewpoint as candidates and attempt to identify the candidate object instance that best matches the selected object instance. Step 112 including the identification of the best matching operation is further described below with regards to FIG. 4. The method 100 loops through steps 108, 110 and 112 until the end of the viewpoints and an optional test is performed at step 113 to determine whether the method 100 has reached the end of the viewpoints. At step 114, the selected object instance corresponding to the aggregated triangles is extracted and provided as output for display, for further processing and/or for storage in a memory. Although the aggregation of the identified candidate object instance to the selected object instance of step 112 is shown in FIG. 1A as being part of the loop, embodiments of the present invention provide for that step being taken outside of the loop at the end of the processing of all viewpoints by deriving a different method or metric for determining the best matching candidate object instance.

According to certain embodiments of the present method, once all viewpoints have been processed, all triangles of the extracted object are known. A new mesh can then be created by gathering the vertices and textures of each triangle of the extracted object. Each triangle contains the indices of the vertices and texture coordinates for the three points composing the triangles and each triangle belongs to a geometry chunk. In addition, each geometry chunk has one texture and the data of the vertices and texture coordinates. This information is stored on the dataset 6. The vertices, texture coordinates, and textures for all triangles underlying the extracted object can be retrieved to create the mesh. This new mesh representing the extracted objected instance can be separated from the global scene and can be presented on a display or saved in a storage device represented as dataset 6 for further manipulation by a user. According to embodiments of the present method, the dataset 6 is used to store various data including segmentation masks, the subset of triangles associated to the selected object instance and other data used in processing the scenes.

The extracted mesh can be rendered in a separate window for example. In some embodiments, the automated extraction method 100 described above can yield strong results, however errors such as outliers or missing triangles can still occur. Embodiments of the present method provide for the mitigation of such errors. In these embodiments, solutions to correct failure cases are integrated in the design of such extraction process and can be performed manually or automatically.

In some embodiments, the extracted object may have missing faces or triangles in situations where the small triangles are too far from the viewpoint to be rendered. In these situations, the extraction of the object is followed by an iterative hole-filling algorithm. In other words, adjacent triangles of each triangle are included if they are not already part of the extracted object. However, this operation may have the undesired effect to also include bordering triangles that are not part of the extracted object. The extracted object can then be shrunk by iteratively removing the bordering triangles, without removing the newly added missing triangles known to be part of the extracted object.

In one embodiment, this two step "grow-shrink" strategy is first performed automatically with a fixed number of iterations. According to certain embodiments, a user of an extraction application implementing the present extraction method can perpetuate either of these two steps until the selected object instance is fully extracted.

In an alternative embodiment, the hole-filling algorithm is configured to allow a user to draw a line bordering the extracted object and to fill any hole within the drawn line and erase any triangle outside the drawn line.

According to certain embodiments, an application implementing the present extraction method is provided with an eraser/includer mechanism which can be used to efficiently add triangles or remove triangles in batch, thus accelerating the correction process. In these embodiments when a triangle is clicked on, the triangle may be removed from the extracted object and when a mouse is held, any triangle met by the cursor may be removed. An adjustable radius can as well be provided with the eraser. The radius defines a reach or adjacency level of the eraser. For example, a radius of 3 will remove up to 3 adjacency levels starting with the triangle selected by the user, the triangles adjacent to the selection, and the triangles adjacent to the adjacent faces. If the default extracted object is deemed satisfactory, with only a few outliers, the eraser can be used to remove the few outliers. Inversely, the eraser/includer mechanism can be used to include triangles with the radius defining the reach or the adjacency level.

As stated above, the 3D environment is represented by a mesh of triangles. In order to identify which triangles of the 3D environment an object is composed of, an image called triangle ID map may be rendered from the same viewpoint used to capture the 2D scene being segmented. FIG. 2A illustrates a triangle ID Map 211 represented in matrix format. Each element of the triangle ID map 211 represents a pixel in the captured scene and its value represents an identifier that uniquely identifies the triangle it renders. For each unique triangle, its number of occurrences in the triangle map is saved in the dataset 6 along with the triangle ID map 211. Although the identification of the unique triangle is depicted with numerical values in the triangle ID map 211, any other identifier that can uniquely identify a triangle within the 3D environment can be used for the purpose of present method.

Figure 2B:
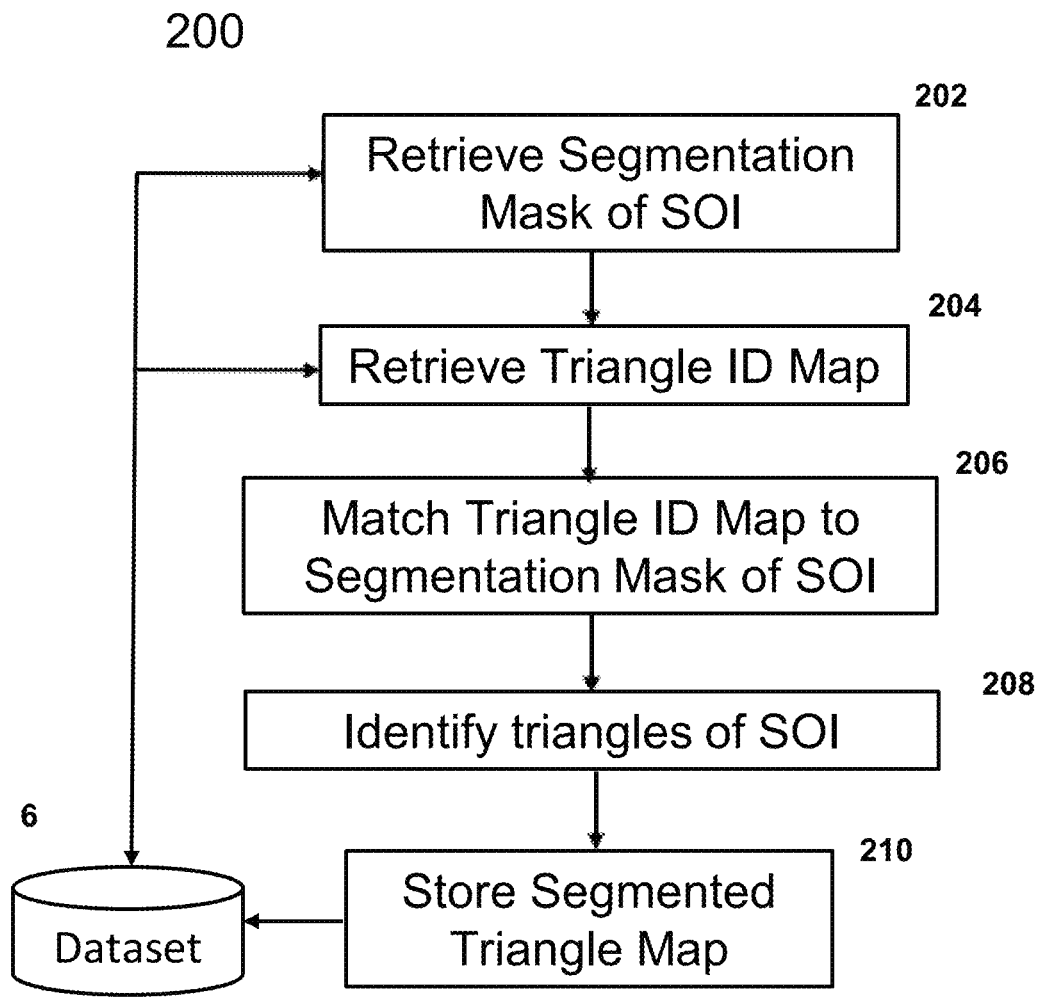
FIG. 2B is a flow chart for mapping a 3D object, in accordance with an embodiment.

FIG. 2B illustrates an exemplary method 200 for mapping the selected object instance (SOI) to its underlying set of triangles. In accordance with an embodiment, at step 202, the segmentation mask matrix 121 of the SOI is retrieved from the dataset 6 and at step 204 the triangle ID Map 211 is retrieved as well from the dataset 6. At step 206 a matching operation is performed between the triangle ID Map 211 and the segmentation mask matrix 121 to identify the triangles underlying the selected object instance (step 208). According to certain embodiments, the matching operation is based on a per-pixel multiplication as illustrated in FIG. 2C which results in a segmented triangle map or set 221 that identifies the set of triangles underlying the SOI from the current viewpoint. At step 210, the segmented triangle map 221 is stored in the dataset 6. It should be understood that any other adequate method known to those skilled in the art can as well be used to identify the triangles underlying the SOI.

Following the identification of the triangles underlying the SOI, the optional filtering of the outliers can be performed as described above with respect to step 107 of FIG. 1. According to certain embodiments, the filtering is performed by determining the number of occurrences for each unique triangle inside the segmented triangle map 221 called herein Nb_OC_SEG_TM and the number of occurrences of this unique triangle inside the triangle map called herein Nb_OC_TM. A ratio of Nb_OC_SEG_TM over Nb_OC_TM is then computed. If this ratio is below a defined threshold, the triangle is considered an outlier and discarded. The filtering based on this heuristic rule filters triangles that only slightly appear inside the segmented triangle map 221. Triangles responsible for rendering walls are usually large and account for many pixels of the triangle map, whereas they only slightly appear in the segmentation map. In one embodiment, the value of the threshold is set to 0.5. The value of the threshold can be determined based on testing performed on the extraction process. It will be understood that other values for the threshold may be used.

Figure 3A:
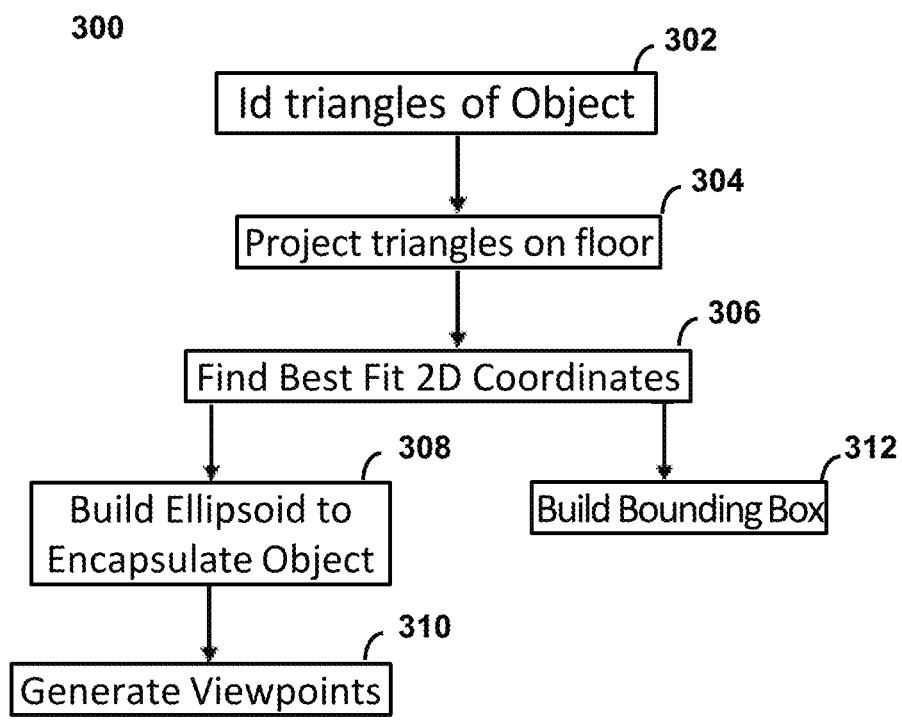
FIG. 3A illustrates a viewpoint generation flow chart, in accordance with an embodiment.

FIG. 3A illustrates an exemplary method 300 for generating viewpoints accordance with an embodiment of the present invention. In one embodiment, the 3D bounding box around an object instance is provided to allow for the determination of a best matching new instance which will be described in FIG. 5.

The method 300 can be applied to any object instance including the selected object instance. At step 302, the triangles forming the selected object instance are identified. World coordinates (X, Y, Z) of the triangles as well as their area and center of mass can be determined from their location in the triangle ID map 221 store in the dataset 6. As stated above, the triangle ID map 211 contains for each pixel the index of the triangle rendered at the position of the pixel. Given a pixel of the triangle ID map 211, the corresponding triangle index is used to recover the correct triangle from the 3D geometry. The triangle contains the information allowing to retrieve the coordinates of its three points, and the area of the triangle can be computed using those coordinates.

By projecting the triangles on the floor plane, i.e., the (X, Y) plane, at step 304 and applying a best fitting model at step 306, a best fitting 2D coordinate system that minimizes the area of a base of the bounding box surrounding the selected object instance can be obtained. The best fitting model of step 306 can be based on a Principal Component Analysis (PCA) or other models known to those skilled in the art. The 2D coordinates can be represented by two orthogonal axes that can form a basis for building an ellipsoid at step 308. According to an embodiment, the ellipsoid is built to encapsulate the selected object instance based on the two axes and the height of the selected object instance. At step 310 a set of viewpoints is generated. The viewpoints are generated to ensure that the entire selected object instance is covered as the imaging device 4 progresses through the viewpoints. For example, the viewpoints can be placed on the surface of the ellipsoid equidistantly from each other along one or more horizontal planes or orbits to ensure a complete coverage of the selected object instance. The number of viewpoints, their location and their spacing may be based on the selected object dimensions and shape. Embodiments of the present mthod also allow for the viewpoints to define a seesaw path on the surface of the ellipsoid where the viewpoints alternate between two or more orbits. For example, a first orbit can be a central ellipse located around the center of mass of the selected object and another orbit can be an upper ellipse located anywhere between the center of mass of the selected object instance and its top or a lower ellipse located anywhere between the center of mass of the selected object instance and its bottom.

At step 312, a bounding box is built from the 2D coordinates found at step 306. The two orthogonal axes representing the 2D coordinates can form the base of the bounding box and its height can be set equal to or larger than the height of the object instance. According to certain embodiments, a bounding box is determined for each object instance present in a scene from a current viewpoint with the bounding box fully encapsulating the object instance.

Figure 3B:
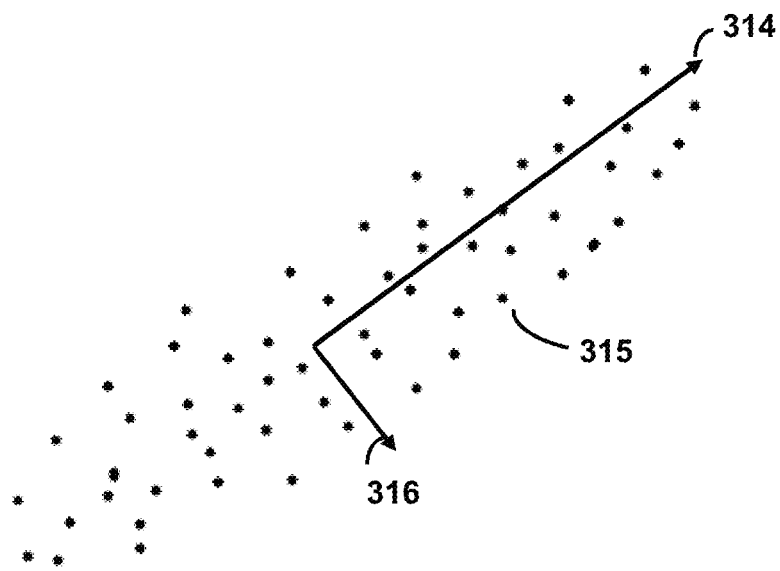
FIG. 3B illustrates a 2D coordinates system, in accordance with an embodiment.
Figure 3C:
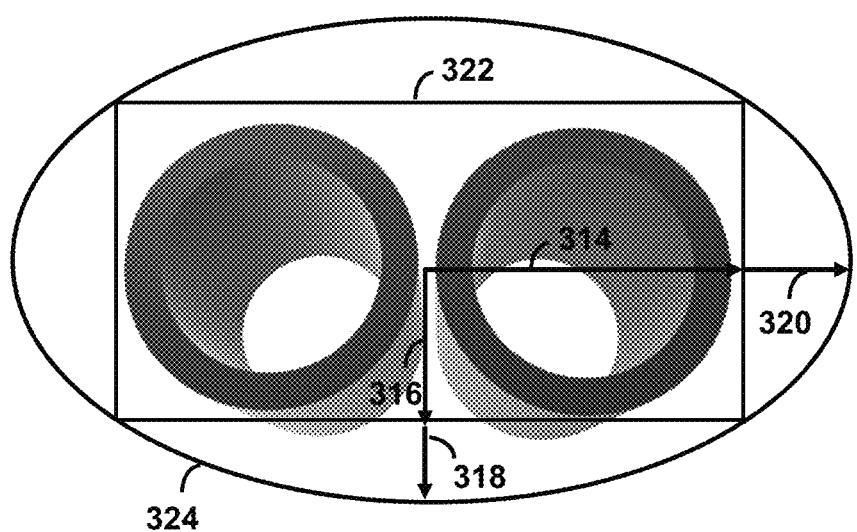
FIG. 3C illustrates a formation of an ellipse and bounding box, in accordance with an embodiment.

FIG. 3B illustrates steps 304 and 306 with the projection of the triangles on the floor plane represented by the projected triangles 315 and the best fit 2D coordinates values represented as major axis 314 and minor axis 316. FIG. 3C illustrates the formation of the bounding box of step 312 with major axis 314 and minor axis 316 used to form the base 322 of the bounding box. The axes 314 and 316 can be scaled up to major axis 320 and minor axis 318 which are used to form the ellipsoid encapsulating the selected object instance. The ellipse 324 of FIG. 3C illustrates the central ellipse having major axis 320 and minor axis 318 and located on the surface of the ellipsoid.

As described above, a set of additional viewpoints are generated and a virtual imaging device is positioned sequentially at each of the set of viewpoints to capture a new 2D scene from each additional viewpoint. Each new 2D scene may contain a new set of object instances or candidate object instances that may or may not be part of the selected object instance. For each new 2D scene obtained from a current or additional viewpoint, a best matching candidate object instance is determined and the selected object instance is updated with the triangles associated with the best matching candidate object instance. In some embodiments, the subsets of triangles gathered from the 2D segmentation masks of the candidate object instances are compared to the known triangles of the selected object instance. The object instance with the closest geometric "proximity" with the selected object instance sees its underlying triangles aggregated to the known triangles of the selected object instance.

Figure 4:
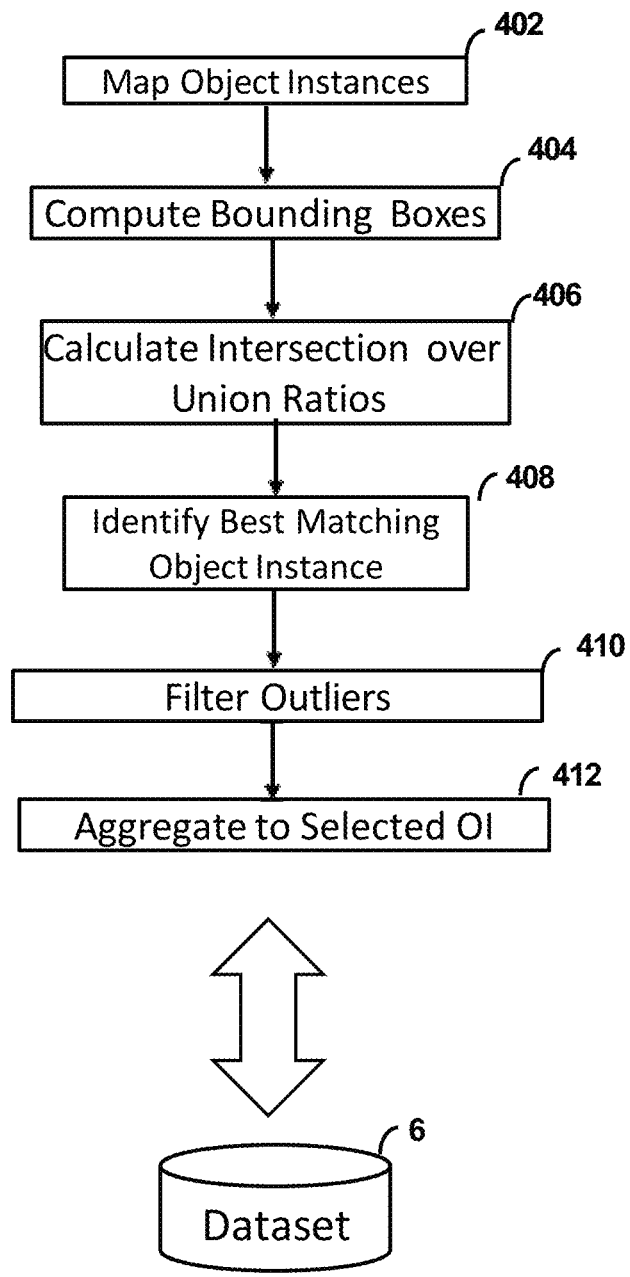
FIG. 4 is a flow chart illustrating a method for updating a selected object, in accordance with an embodiment.

FIG. 4 illustrates an exemplary method for updating the selected object instance. In this method, a segmentation mask is applied to each of the candidate object instances present in the scene. At step 402, a mapping of each of the object instances to its underlying set of triangles is performed. At step 404, a bounding box is built for each of the candidate object instances and for the selected object instance. The bounding box for any object instance can be built as described in FIG. 3A. The intersection over union (IOU) ratios of the 3D bounding boxes between selected object instance and candidates are computed at step 406. Computing the IOU ratio is known to those skilled in the art and is used to measure the extent of overlap between the selected object instance and a candidate object instance. If the ratio is over a given threshold (e.g. 0.25), the candidate object instance is considered to be part of the extracted object. The given threshold can as well be set to a different value. In certain embodiments, the given threshold may be set after some performance testing of the extraction process to identify an optimal value for the given threshold. The candidate object instance with the highest ratio is identified as the best matching object instance at step 408. If no instance satisfies this threshold, the extracted object is not updated. At step 412, the set of triangles underlying the best matching candidate object instance is aggregated to the set of triangles representing the selected object instance and stored in the dataset 6. The aggregation can be done by appending the triangles to the segmented triangle map or set 221 of the selected object instance.

In one embodiment, a filtering operation may be performed to enhance the results of the extraction process. The filtering operation is performed at step 410 to discard outlier triangles from the best matching candidate object instance based on their likelihood of actually not belonging to the selected object instance. Although the filtering is shown to be performed prior to the aggregating step 412, those skilled in the art will recognize that such step can be performed after the aggregating step.

Figure 5:
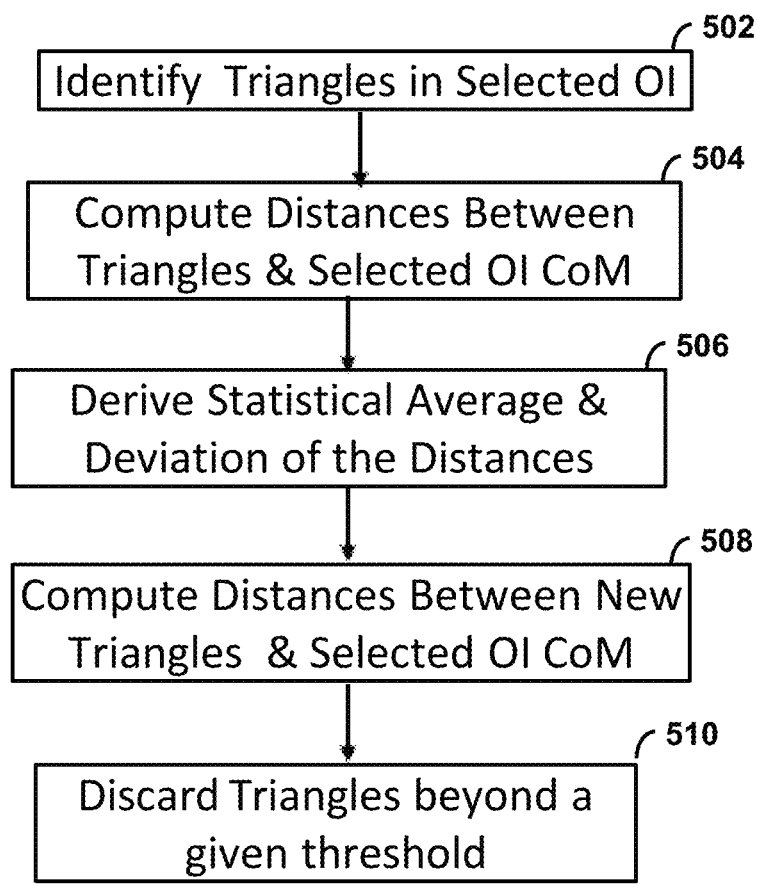
FIG. 5 is a flowchart illustrating a filtering method, in accordance with an embodiment.

In an embodiment in which the instance segmentation neural network 8 is unpredictable, the segmentation mask applied to an object instance may include parts of objects that are different from the object instance itself resulting in the best matching object instance including triangles outliers. Embodiments of the present technology provide for the removal of such outliers as shown in step 410. FIG. 5 illustrates an exemplary filtering operation in accordance with these embodiments. At step 502, triangles associated with the selected object instance are identified and, at step 504, the distances between the triangles and the center of mass of the selected object instance are computed. At step 506, the statistical average (M) and standard deviation (S) of the distances are computed. At step 508, the distances between the triangles associated with the best matching object instance and the selected object instance are also computed. According to an embodiment of the present invention, the distances between the triangles and the selected object instance are computed using the center of mass (COM) of the triangles and the center of mass of the selected object instance. At step 510 triangles of the best matching object instance that lie beyond a given threshold are discarded. The given threshold can be set at a distance M+kS from the COM of the selected object instance with k a factor that can be set to any suitable real number in the R+set [0, +∞].

The value of k can be set according to the accuracy level of the ISNN 8 and the composition of the 3D environment. Those skilled in the art will understand that the value of k is linked to the strength of the filter with a low-value k providing a stronger filter. Outliers may greatly bias the center of mass of the extracted object toward other objects in the scene. In embodiments where a strong filter to be used, triangles that are part of the extracted object can be excluded. In these embodiments, the extraction process may be provided with a post processing capability that can restore excluded triangles automatically or manually as previously described.

The filtering model described above is based on a given threshold to determine which triangles to remove however any outlier filter or segmentation mask refinement technique can be used for the purpose of the invention. Alternative filtering models include segmentation masks refinement using image transformations, mixture of experts, clustering techniques and other models known to those skilled in the art.

Figure 6:
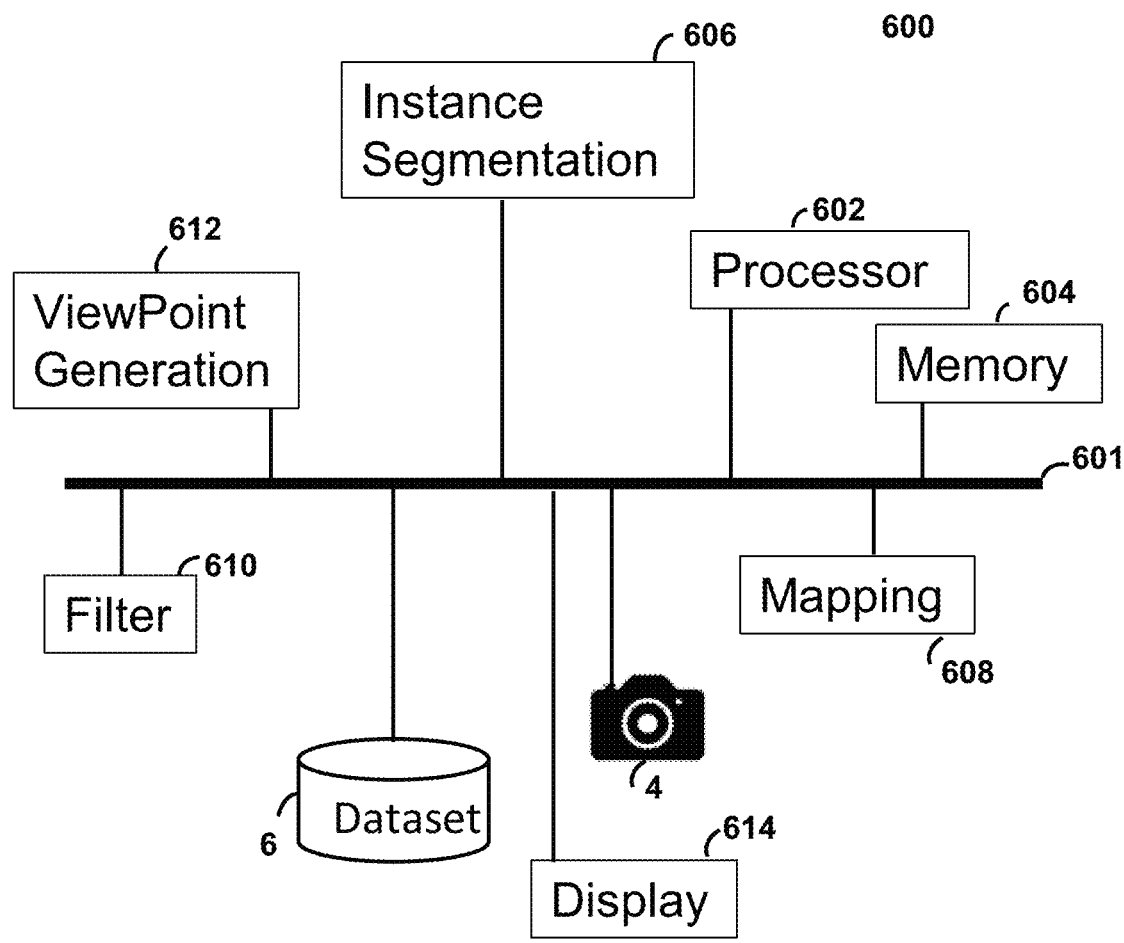
FIG. 6 is a block diagram illustrating a system for extracting an object from a 3D environment, in accordance with an embodiment.

FIG. 6 illustrates one embodiment of an apparatus 600 configured for extracting a 3D object instance present in a 3D virtual environment. The apparatus 600 comprises a processor 602 and a memory 604 capable of storing program instructions for execution by the processor 605. The processor 602 can be one or more Computer Processing Units (CPUs) and/or Graphic Processing Units (GPUs) a microprocessor or any processor device capable of executing modules or programs and/or instructions stored in memory 604 and thereby performing the operations of the present invention. The memory 604 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 604 optionally includes one or more storage devices remotely located from the processor 605. The memory 604, or alternately the non-volatile memory device(s) within the memory 604, comprises a non-transitory computer readable storage medium.

The apparatus 600 comprises a viewpoint generation module 612 for generating viewpoints as described above. An instance segmentation module 606 is provided in the apparatus 600 to segment a scene as described above. The instance segmentation module 606 can be used to implement the instance segmentation neural network 8 or any other instance segmentation model that can be used for the purpose of this invention. A filter 610 is provided with the apparatus 600 for implementing various filtering operations as described above. The apparatus 600 comprises as well as a mapping module 608 for implementing the mapping operations described above. Other components of the apparatus include the imaging device 4 and the dataset 6. The apparatus 600 may also be provided with connectivity options such as a wired or wireless interface for connecting to a data network (not shown).

Each of the above identified elements may be stored in one or more of the previously mentioned memory devices and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 604 may store a subset of the modules and data structures identified above. Furthermore, the memory 604 may store additional modules and data structures not described above.

Embodiments of the present technology provide for the apparatus to be a single integral entity or a distributed system using different physical resources such as resources in a data network, a data center, a cloud resources center or a combination thereof.

It should be noted that methods and systems of the embodiments of the invention and data described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media. The methods and systems of the present invention have tangible and practical advantages, providing more expedient and more reliable processing of vast amounts of data.

What is claimed:

1. A computer-implemented method for extracting a three-dimensional (3D) object from a 3D environment comprising a mesh of triangles, the method comprising:
   segmenting an initial two-dimensional (2D) scene of the 3D environment obtained from an initial viewpoint, thereby identifying a plurality of object instances within the initial 2D scene;
   mapping a selected one of the object instances to an initial subset of the triangles underlying the selected one of the object instances, wherein the selected one of the object instances is to be extracted, wherein the mapping comprises performing a matching operation between a triangle identification map and an initial segmentation mask corresponding to the object instance to be extracted to identify the subset of triangles, the matching operation comprising:
   retrieving an initial segmentation mask corresponding to the object instance to be extracted;
   retrieving a triangle identification map corresponding to the 2D scene captured from the initial viewpoint; and
   correlating the triangle identification map to the initial segmentation mask to identify the initial subset of triangles;
   generating a plurality of additional viewpoints around the selected one of object instances within the 3D environment, and for each one of the plurality of additional viewpoints:
     generating a further 2D scene based on the 3D environment, the further 2D scene generated from the additional viewpoint, the additional viewpoint positioned based on at least one other additional viewpoint in the plurality of additional viewpoints;
     segmenting the further 2D scene, thereby identifying candidate object instances present in the further 2D scene;
     identifying a given one of the candidate object instances as best matching the object instance to be extracted, thereby obtaining a best matching candidate object instance;
     identifying an additional subset of the triangles underlying the best matching candidate object instance; and
     aggregating the additional subset of the triangles to the initial subset of the triangles, thereby obtaining an updated subset of the triangles; and
   outputting the updated subset of the triangles, thereby extracting the object instance to be extracted.

2. The method of claim 1, further comprising identifying, from the initial subset of the triangles, outlier triangles that do not belong to the selected one of the object instances and removing the outlier triangles from the initial subset of the triangles.

3. The method of claim 1, further comprising identifying, from the additional subset of the triangles, outlier triangles that do not belong to the best matching candidate object instance and removing the outlier triangles from the additional subset of the triangles.

4. The method of claim 1, further comprising at least one of adding a first plurality of triangles of the selected object instance to the initial subset of the triangles and removing a second plurality of triangles associated with the selected object instance from the initial subset of the triangles.

5. The method of claim 1, wherein the plurality of additional viewpoints are positioned on a surface of one of an ellipsoidal encapsulating the selected object instance and a sphere encapsulating the selected object instance.

6. The method of claim 1, wherein said identifying the given one of the candidate object instances as best matching the object instance to be extracted comprises:
building a candidate bounding box around each candidate object instance and a selected bounding box around the selected object instance;
computing an intersection over union ratio between each candidate bounding box and the selected bounding box; and
identifying the candidate object instances having a highest intersection-over-union ratio value and determining the candidate object instance corresponding to said identified candidate object instance as the best matching candidate object instance.

7. A system for extracting a three-dimensional (3D) object from a 3D environment comprising a mesh of triangles, the system comprising:
a processor; and
a non-transitory computer-readable storage medium having instructions stored thereon that, when executed, causes the processor to:
segment an initial two-dimensional (2D) scene of the 3D environment obtained from an initial viewpoint, thereby identifying a plurality of object instances within the initial 2D scene;
map a selected one of the object instances to an initial subset of the triangles underlying the selected one of the object instances, wherein the selected one of the object instances is to be extracted, wherein said mapping comprises performing a matching operation between a triangle identification map and an initial segmentation mask corresponding to the object instance to be extracted to identify the subset of triangles, the matching operation comprising:
retrieving the initial segmentation mask corresponding to the object instance to be extracted;
retrieving the triangle identification map, wherein the triangle identification map corresponds to the 2D scene captured from said initial viewpoint; and
correlating said triangle identification map to said segmentation mask corresponding to the object instance to be extracted to identify the initial subset of triangles;
generate a plurality of additional viewpoints around the selected one of object instances within the 3D environment, and for each one of the plurality of additional viewpoints:
generate a further 2D scene based on the 3D environment, the further 2D scene generated from the additional viewpoint, the additional viewpoint positioned based on at least one other additional viewpoint in the plurality of additional viewpoints;
segment the further 2D scene, thereby identifying candidate object instances present in the further 2D scene;
identify a given one of the candidate object instances as best matching the object instance to be extracted, thereby obtaining a best matching candidate object instance;
identify an additional subset of the triangles underlying the best matching candidate object instance; and
aggregate the additional subset of the triangles to the initial subset of the triangles, thereby obtaining an updated subset of the triangles; and
output the updated subset of the triangles, thereby extracting the object instance to be extracted.

8. The system of claim 7, wherein the processor is further configured for identifying, from the initial subset of the triangles, outlier triangles that do not belong to the selected one of the object instances and removing the outlier triangles from the initial subset of the triangles.

9. The system of claim 7, wherein the processor is further configured for identifying, from the additional subset of the triangles, outlier triangles that do not belong to the best matching candidate object instance and removing the outlier triangles from the additional subset of the triangles.

10. The system of claim 7, wherein the processor is further configured for at least one of adding a first plurality of triangles of the selected object instance to the initial subset of the triangles and removing a second plurality of triangles associated with the selected object instance from the initial subset of the triangles.

11. The system of claim 7, wherein the plurality of additional viewpoints are positioned on a surface of one of an ellipsoidal encapsulating the selected object instance and a sphere encapsulating the selected object instance.

12. The system of claim 7, wherein said identifying the given one of the candidate object instances as best matching the object instance to be extracted comprises:
building a candidate bounding box around each candidate object instance and a selected bounding box around the selected object instance;
computing an intersection over union ratio between each candidate bounding box and the selected bounding box; and
identifying the candidate object instances having a highest intersection-over-union ratio value and determining the candidate object instance corresponding to said identified candidate object instance as the best matching candidate object instance.

13. An apparatus for extracting a three-dimensional (3D) object from a 3D environment comprising a mesh of triangles, the apparatus comprising:
a memory, comprising:
an instance segmentation neural network model configured to segment an initial two-dimensional (2D) scene of the 3D environment obtained from an initial viewpoint, thereby identifying a plurality of object instances within the initial 2D scene; and
a mapping operation for mapping a selected one of the object instances to an initial subset of the triangles underlying the selected one of the object instances, wherein the selected one of the object instances is to be extracted, wherein the mapping operation is configured to identify the subset of triangles using a matching operation between a triangle identification map and a segmentation mask of the selected object instance, the matching operation comprising:
retrieving the initial segmentation mask corresponding to the object instance to be extracted;

retrieving the triangle identification map, wherein the triangle identification map corresponds to the 2D scene captured from said initial viewpoint; and correlating said triangle identification map to said segmentation mask corresponding to the object instance to be extracted to identify the initial subset of triangles; and a processor in communication with the memory, the processor configured to generate a plurality of additional viewpoints around the selected one of object instances within the 3D environment, and for each additional viewpoint of the plurality of additional viewpoints:

generate a further 2D scene based on the 3D environment, the further 2D scene generated from the additional viewpoint, the additional viewpoint positioned based on the at least one other additional viewpoint in the plurality of additional viewpoints;

direct the instance segmentation neural network model to segment the further 2D scene, thereby identifying candidate object instances present in the further 2D scene;

identify a given one of the candidate object instances as best matching the object instance to be extracted, thereby obtaining a best matching candidate object instance;

direct the mapping operation to identify an additional subset of the triangles underlying the best matching candidate object instance;

aggregate the additional subset of the triangles to the initial subset of the triangles, thereby obtaining an updated subset of the triangles; and output the updated subset of the triangles, thereby extracting the object instance to be extracted.

14. The apparatus of claim 13, further comprising a filter for identifying, from the initial subset of the triangles, outlier triangles that do not belong to the selected one of the object instances and removing the outlier triangles from the initial subset of the triangles.

15. The apparatus of claim 13, further comprising a filter for identifying, from the additional subset of the triangles, outlier triangles that do not belong to the best matching candidate object instance and removing the outlier triangles from the additional subset of the triangles.

* * * * *